Jan. 16, 1968   W. A. VAN DEN BROEK ET AL   3,363,766
SWIMMING POOL APPARATUS
Filed June 22, 1964   6 Sheets-Sheet 1

INVENTORS
William A. Van Den Broek
Ira Silverman
BY
Bilker + Moyerman
ATTORNEYS

Jan. 16, 1968 W. A. VAN DEN BROEK ET AL 3,363,766
SWIMMING POOL APPARATUS
Filed June 22, 1964 6 Sheets-Sheet 4

INVENTORS
William A. Van Den Broek
Ira Silverman
BY
Bilker + Moyerman
ATTORNEYS

Jan. 16, 1968 W. A. VAN DEN BROEK ET AL 3,363,766
SWIMMING POOL APPARATUS
Filed June 22, 1964 6 Sheets-Sheet 6

INVENTORS
William A. Van Den Broek
Ira Silverman
BY
Bilker + Moyerman
ATTORNEYS

United States Patent Office 3,363,766
Patented Jan. 16, 1968

3,363,766
SWIMMING POOL APPARATUS
William A. van den Broek, Buckingham, and Ira Silverman, Chalfont, Pa., assignors to Sylvan Pools, Inc., Doylestown, Pa., a corporation of Pennsylvania
Continuation-in-part of application Ser. No. 222,826, Sept. 11, 1962. This application June 22, 1964, Ser. No. 377,002
32 Claims. (Cl. 210—169)

This application is a continuation-in-part of application Ser. No. 222,826, filed Sept. 11, 1962, now Patent 3,139,067, issued June 30, 1964.

This invention pertains to swimming pool water treatment apparatus. More particularly, it pertains to unitary apparatus which combine the functions of heating and filtering. In brief, it pertains to swimming pool filter-heater combinations.

The utility of, and need for, swimming pool filters has long been recognized. With such apparatus, fine foreign matter can be removed from water and original clarity maintained and restored. Often, in connection with a type of swimming pool filter known as a sand filter or sand and gravel filter, chemical additives, such as flocculents, are used to increase the total effectiveness of filtration. Filters are, therefore, essential items of equipment in pools where water is recirculated and where the only fresh water added during the swimming season is that which replaces evaporative or overflow losses.

Less essential to pool operation, but of increasing importance, are swimming pool water heaters. These devices enable the season for use of outdoor pools to be extended from early spring to late fall. Unlike domestic hot water heaters, where a relatively small quantity of water is to be heated through a large number of degrees (e.g. from ambient to 140° F.), these heaters heat large volumes of water through a relatively small number of degrees. In typical applications, heaters are used to maintain swimming pool temperatures in the range of 75-80° F., when daily average or mean ambient temperatures are as low as 60° F.

Customarily the filtration and heating fununctions are performed by separate, unrelated units—a filter and a heater.

Filters used in swimming pool work are of two basic types. The first type is a filter, commonly known as a sand filter or sand and gravel filter, which contains silicious material such as, for instance, sand or mixtures of sand and gravel. In these filters, the interstices between the fine sand particles perform the actual filtration. As the filter is used, dirt builds up in the sand and this dirt is removed periodically by reversing the direction of flow and "backwashing" the dirt into a sewage system.

A second type of filter, commonly used, is known as a diatomaceous earth filter. In this type of filter, mechanisms are provided which can support a coating of diatomaceous earth. These filters are "pre-coated" with diatomaceous earth which builds up on the surface of supporting elements (e.g. bags, leaves made of screen, etc.). It is the coating of diatomaceous earth, containing fine interstices as it does, which does the actual filtration, the understructure only supporting the coating and keeping the diatomaceous earth intact. Periodic additions of diatomaceous earth present new and fresh filter surfaces to the liquid coming through and the process is repeated until the coating becomes so thick that the hydraulic pressure drop across the filter elements is unmanageable. At that time the filter is physically cleaned and the old, dirt-laden diatomaceous earth removed.

Our prior application Ser. No. 222,826 filed Sept. 11, 1962, now Patent 3,139,067, issued June 30, 1964, pertains to a filter-heater combination. This application is a continuation-in-part thereof. In that patent a filter-heater combination is disclosed in which an annular sand filter is mounted coaxially about a water heater core. Flow is from the swimming pool through the filter and thence, via the heater, back to the swimming pool. In other words, it discloses filtration followed by heating as used, specifically, with a sand filter.

The instant application is directed to filter-heater combinations wherein filtration can be performed subsequent to heating, wherein the water heater can be located concentrically about a filter core and wherein, further, diatomaceous earth filters as well as sand filters may be utilized.

Accordingly, it is an object of the invention to provide a combination filter-heater which can heat and filter simultaneously and perform both functions with high efficiency.

It is also an object of the invention to provide filter-heater combinations wherein filtration may be performed prior to heating and/or vice versa.

An additional object of the invention is to provide filter-heater combinations wherein the combustion chamber or water heating portion is mounted concentrically about the filtration portion.

It is also an object of the invention to provide a filter-heater combination wherein the filter is of the diatomaceous earth type and wherein, further, the number of square feet of effective filter surface can be varied to suit the application of the unit.

It is also an object of the invention to provide an improved filter-heater combination wherein filtration can be performed in a relatively shallow depth of silicious filter medium, thus making possible construction of a unit having a relatively low height.

Another object of the invention is to provide an improved filter-heater combination wherein a substantial portion of the heat exchange means is readily renewable and replaceable.

Provision of a combined filter-heater wherein by-pass means are provided for adjusting the amount of the water being heated while keeping the amount of water being filtered constant are also an object of the invention.

An additional object of the invention is to provide an apparatus of the type described wherein control of outlet water temperature is accurate and control of gaseous fuel is safe, utilizing no complicated or sophisticated components liable to be a source of further maintenance and adjustment problems.

It is also an object of the invention to provide filter-heater combinations which can utilize a wide variety of fuels.

Also, among the objects of the invention, is the provision of swimming pool filter-heater combinations wherein a novel underdrain or collector is employed to minimize silicious filter medium depth and to allow for high capacity efficient filtration in low units.

A further object of the invention is to provide a single piece of apparatus which will serve as a filter, a water heater, a pump mount or bed plate and which will include self-contained control devices so that the totality of the apparatus can be inserted in swimming pool piping and need only be connected to energy sources to be rendered operational.

Other objects of the invention are to provide improved apparatus of the character described which are sturdy in construction, economical to produce and install, and highly efficient in operation.

These and other objects of the invention will be apparent to those skilled in the art from a consideration of the description which follows, when read in conjunction with the accompanying drawings, in which.

Referring now to the drawings, wherein like numerals designate like parts, it will be observed that the filter-heater combination comprises a shell A having within it a filter section B and a water heater or combustion chamber C. Caloric energy for the heater of chamber C is supplied by a burner assembly D and fuel flow to the burners is controlled by thermostatic controller E.

Figure 1:
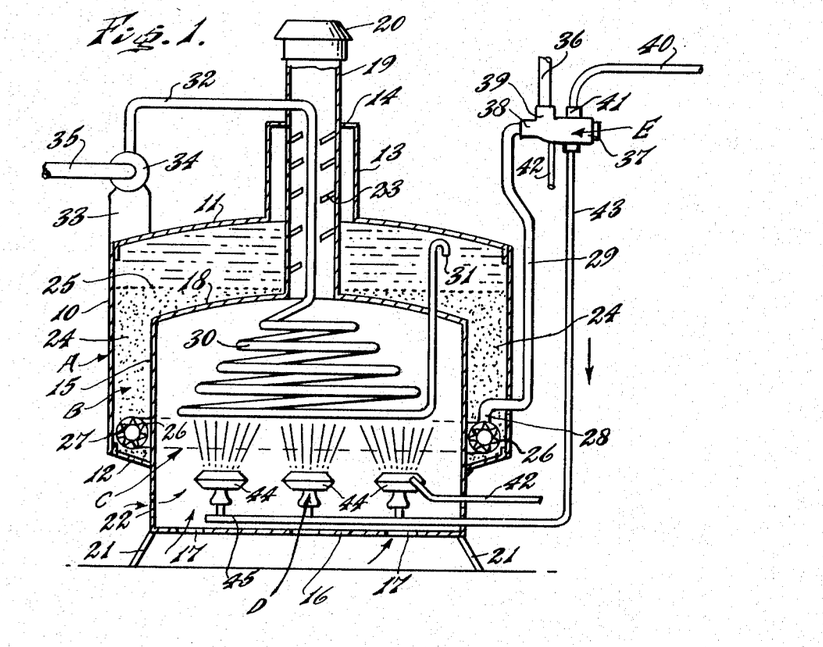
FIGURE 1 represents a sectional view of a filter-heater combination of the invention, of the sand type, having an annular filtration section and an axial water heating section, wherein heating is followed by filtration.
Figure 2:
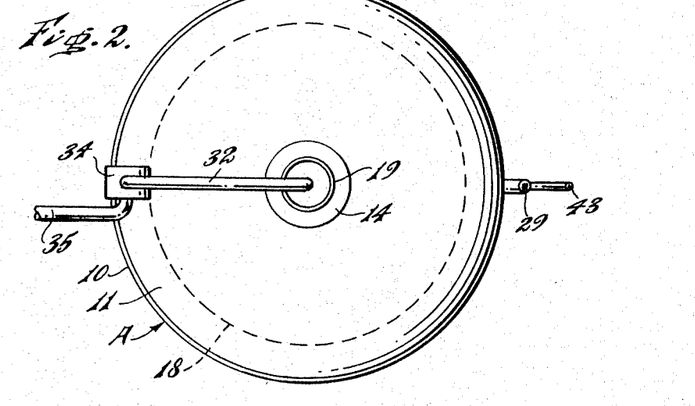
FIGURE 2 is a modified top plan view of the filter-heater combination of FIGURE 1.

Referring now to FIGURES 1 and 2 it will be observed that the embodiment of the invention shown therein includes a shell A which comprises a vessel having a cylindrical wall portion 10 to which is affixed a top 11, preferably dished, and a bottom 12 which is also preferably dished to provide smooth internal corners and thus prevent hydraulic turbulence. Top 11 and bottom 12 are fixed to wall 10 by welding, as is customary in the fabrication of pressure vessels built according to the A.S.M.E. code for pressure vessels. Top 11 is provided with a central circular cut-out to which is affixed a riser 13 capped as at 14 in any suitable manner with an annular cap. The shell A is coaxially mounted on, affixed to and supported by combustion chamber or heater section C. Chamber C includes cylindrical sidewalls 15, a flat foraminous bottom 16 affixed thereto which contains a plurality of variable diameter air-inlet orifices 17, a head 18, preferably dished, and a chimney 19 which is mounted on a cut-out in head 18 and is capped by a draft hood 20. Chimney 19 is preferably coaxially mounted within riser 13. Cap 14, which is annular in configuration, abuts the exterior of the chimney. The entire assembly may be supported by a plurality of legs 21, in which case, combustion air can be supplied through inlets 17 as indicated by the arrows. However, alternate air-inlets 22 are provided in the lower portion of sidewall 15 and, if desired, the unit can be mounted directly on the ground, without legs 21, and total combustion air requirements supplied by inlets 22 as indicated by the arrows with inlets 17 rendered inoperative.

Chimney 19 may be provided with a plurality of internal baffles or retarders 23 which insure more efficient combustion and lower stacked outlet temperatures. The baffles may be formed of a single piece having a helical configuration or of a plurality of separate units.

The annular space between the exterior of water heater or combustion chamber C and the interior of shell A defines and constitutes filter section B. It should be noted immediately that the net effective cross-section of this filter section, proximate the top of sidewalls 15, is far less than the cross-section above dished head 18. Consequently, when water moves downward (with reference to FIGURE 1) there is an increase in velocity as it enters the narrowed annulus between wall portion 10 and combustion chamber sidewalls 15. The advantage of this physical design consideration, as related to high filtration capacity, will be discussed below.

Section B is filled with a silicious filtration medium 24 which extends downward from water-filter medium interface 25. The bottom of section B is provided with a high capacity collector 26. This toroidal collector, of novel design, is ring-shaped in plan view and circular in cross-section. While it may be made of perforated metal, it is preferably fabricated of a synthetic corrosion-resistant material such as, for example, a long chain polyamide of the nylon type. The sleeve may be formed of an inner and outer layer of material reinforced and spaced apart by a metal wire spider 27 which gives it rigidity and prevents its collapse. At at least one point on its perimeter, collector 26 is provided with an outlet fitting or transition piece 28 which, in turn removably connects to a conduit 29 which leads to thermostatic controller E.

Water heater or combustion chamber C contains an helical heating coil 30 suitably removably mounted coaxially therein. The coil 30 terminates at one end in a goose-neck riser 31 which penetrates head 18 and discharges within filter section B above interface 25. The other end of the coil, its feed end, connects to a conduit 32 one end of which penetrates chimney 19 and is encapsulated thereby as it drops into the section of the chamber below head 18.

Mounted on the shell A, as with bracket or weldment 33 is a pump 34 which may be of any conventional type including, preferably, self-priming centrifugal. Pump 34 takes its suction from the pool through suction line 35 and discharges via conduit 32, helical coil 30 and riser 31 into filter section B.

The hydraulic circuit, when the unit is heating and filtering may be summarized as follows: The pump 34 takes water from the pool through suction line 35 and pumps through conduits 32, coil 30 and riser 31 into filter section B. Water flows downward, past interface 25, through the filter medium 24 and thence into collector 26. Water leaving the collector through transition piece 28 enters conduit 29 and goes from there into the body of thermostatic controller E. It is thence returned to the pool through discharge line 36. It should be noted that any expension of liquid (e.g. as by heating during periods when the pump is not running) merely causes the incremental volume of liquid to flow to the pool through the unobstructed non-valved flow path just described.

The filter medium is backwashed in a conventional manner by reverse flushing with a stream of water and running the effluent to a sewer. Auxiliary piping for supplying wash water to the collector via conduit 29 and for removing effluent to the sewer from above interface 25, as well as a multi-port valve for use during the backwash period are conventional, form no part of the instant invention and are, accordingly, not shown.

The thermostatic controller E is a conventional unit such as is sold under the trademark "Unitrol" by the Grayson Controls Division of the Robertshaw-Fulton Controls Company and are described fully, inter alia, in their bulletins 28–050–0046 and 28–050–0069D as well as specifically in U.S. Patent Nos. 2,953,937 and 2,982,148. Briefly reviewing its operation, it uses water temperature as a parameter for controlling gas flow while at the same time supplying a pilot light quantity of gas to the burners, independent of temperature variations. It further incorporates manual on-off features and fail-safe mechanisms which detection the absence of flame and shut off the gas supply in such an event. An advantage of the instant invention, compared to the prior art, is its ability to use such relatively standard controls rather than combinations of relays, solenoid valves and remote sensors. The logic of control will be discussed in more detail below.

Returning now to the description of controller E, it comprises a body or housing 37 containing an integral water passage including an inlet 38 and an outlet 39, to which discharge line 36 is connected. As can be seen in the drawing, heated water returning to the pool passes through this passage. A bi-metallic element extends into the water passage and senses the temperature therein. Fuel gas (e.g., natural or manufactured) from main gas line 40 enters the controller through gas port 41. Within the unit, the gas flow is split into a pilot stream and a burner feed stream, the former being conveyed to the pilots by pilot line 42 and the latter flowing to the burners via feed line 43 as indicated by the arrow.

The burner, indicated generally as 44, may be suitably mounted within the combustion chamber, as on header 45. A preferred burner is made of cast iron with annular ports which distribute an even and continuous halo pattern flame concentrated over predetermined portions of coil 30. The pilot associated with each burner may be side mounted for quick lighting and the pilot flame is not affected by off and on actions of the burner. It is obvious that other sources of fuel such as oil and electricity may, with suitable modifications, be utilized.

Turning now to a discussion of the apparatus and its superiority compared to the prior art apparatus, consider first the filtration function. The filter medium 24 is fine sand. Such material is used in conventional sand and gravel filters but in these filters is supported by coarse sand which in turn is supported by a bottom layer of pea gravel. This arrangement equalizes hydraulic resistance over the cross-section of the filters and yet, just the fine sand performs the filtration. In the embodiment of the invention shown, the collector 26 is of extremely large effective area and because of its annular shape presents a uniform hydraulic resistance at any point in the bottom of the filter section B. Bottom 12 supports the sand and thus the two functions of the conventional gravel bed (i.e. support and hydraulic equalization) are performed by the apparatus itself. On backwash, other advantages are apparent. The backwash stream leaves collector 26 at a uniform perimetrical rate and distribution. Any tendency to channel is avoided because flow, of necessity, is at a high velocity due to the restricted cross-section between wall 15 and wall 10. There is more than enough mass flow volume to scour the entire cross-section of the annulus.

The heating and control functions also are affected in a manner which simultaneously achieves high efficiency and trouble-free operation. When the unit is started, the pilots are lit and gas continues to flow through pilot line 42 as long as the controller E permits. The controller, as is customary, contains a safety pilot shut-off valve which automatically shuts off gas to burner 44 and their associated pilots if there is an interruption to the flow of gas in line 40. Controller E also includes a snap-action bi-metallic thermostat which senses the temperature of water in line 29 and which cuts off flow of gas through feed line 43 when the temperature rises above a pre-set point. Thus, flow of gas to burners 44 is an inverse on-off function of discharge water temperature. Air to support combustion enters through orifices 17 or, depending on whether the unit is ground-mounted or not inlets 22. Both of these may be properly adjusted for $CO_2$ content in the combustion gas, and the gas is vented through hood 20. The baffles reduce stack temperature so that hood 20 is generally safe to touch but, more important, the chimney 19 at its hottest and most dangerous levels is completely water jacketed by riser 13.

Heating the water prior to filtration, as is done in the embodiment shown, tends to make any "salting-out" occur within filter section B where mineral deposits can be removed by the filter medium 24. It should also be noted that heat exchange occurs not only in coil 30 and associated conduits 31 and 32 but also through walls 15 and head 18.

Figure 3:
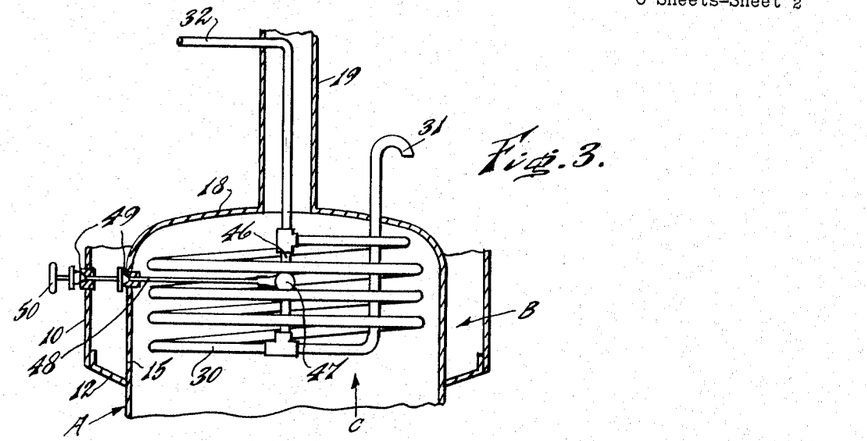
FIGURE 3 represents a fragmentary elevational view of a heater by-pass arrangement useful in conjunction with those filter-heater combinations of the invention having axial water heating sections such as, for example, the embodiment shown in FIGURES 1, 2, 11 and 13.

FIGURE 3 illustrates a modification of the invention which may be utilized in connection with the embodiment previously described, as well as in connection with the axial water heater embodiments which will be described below. Essentially the embodiment shown in FIGURE 3 includes a vertical by-pass line 46 connecting the two ends of coil 30. In the by-pass line is a by-pass valve 47, operated by an elongated stem 48, which passes through combustion chamber sidewall 15 and filter chamber sidewall 10 with the aid of packing glands 49. Operation may be effected by a valve handle 50, or may be automatically controlled as a function of temperature. When valve 47 is closed all water coming from the pool through conduit 32 passes through coil 30 and is discharged from goose-neck riser 31 into filter section B, having been heated to its maximum extent. In brief, with the valve closed all of the water which is heated is also filtered. However, with the valve 47 open little, if any, water passes through coil 30 and, consequently, the mass rate of flow of water through heater C is great enough to minimize heating. It is thus seen how this by-pass arrangement gives the operator an additional degree of control over outlet water temperature, beyond that available to him through the mere setting of controller E.

The embodiments described above have been described in detail and at length. The embodiments which will now be described are generally similar except for those specific differences which will be described in detail. Where nothing is said about details of construction, controls, ancillary equipment and the like these are to be taken as similar or identical to those discussed above. It is assumed that one skilled in the art will, almost from the figures alone, have a ready comprehension of the variants which will now be discussed.

Figure 4:
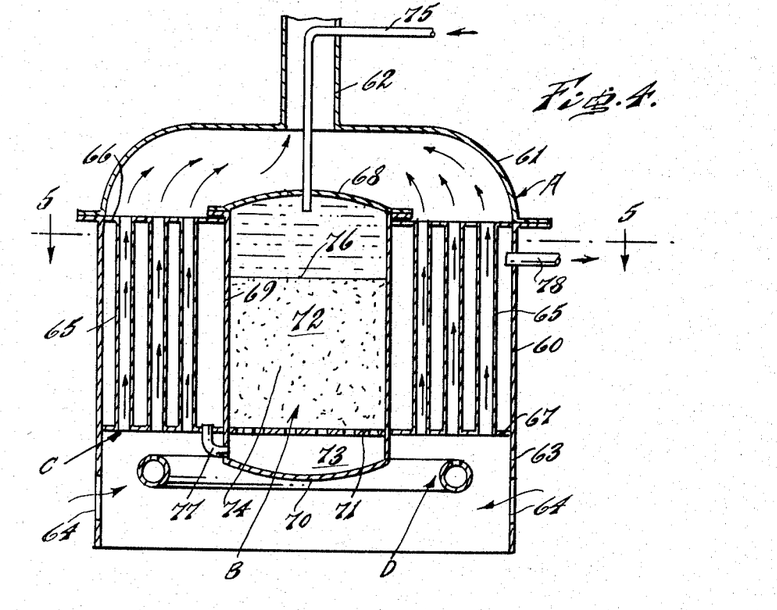
FIGURE 4 represents a sectional view of a filter-heater combination of the invention, of the sand type, having an axial filtration section and an annular water heating section, wherein filtration is followed by heating.
Figure 5:
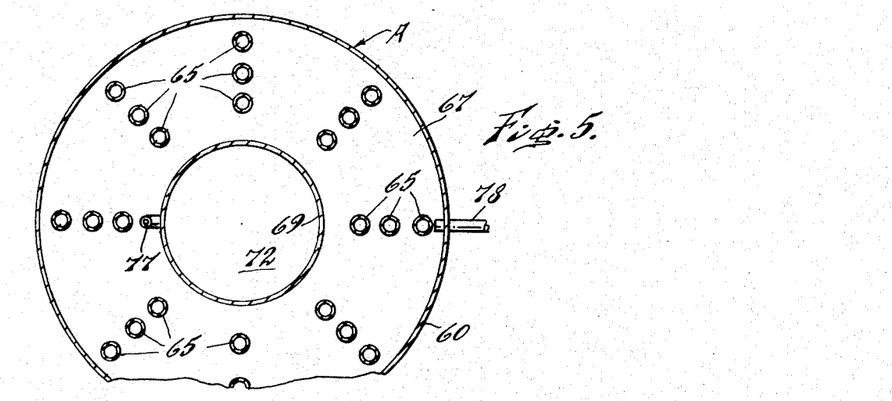
FIGURE 5 represents a fragmentary section taken on line 5—5 of FIGURE 4.

In FIGURES 4 and 5 an embodiment of the invention is shown wherein the filter section B while still in concentric relationship to the heater lies along the longitudinal axis of the apparatus and where the combustion chamber or heater C is mounted annularly thereabout. With particular reference to these figures, it will be observed that the shell A includes sidewalls 60, a dished head 61, and a chimney 62 extending longitudinally upward therefrom. Lower wall portion 63 may serve as legs for the unit and may also include variable-opening air-inlets 64 through which combustion air is admitted.

Heat is supplied by a suitable burner assembly D which may be, as shown of the perforated toroid type, or, inter alia, of the type shown in FIGURE 1. Water heater C includes a plurality of fire-tubes 65 which are mounted between an upper tube sheet 66 and a lower tube sheet 67. Combustion gases flow upward through tubes 65, into the chamber defined by the interior of head 61 and up through chimney 62 which may, if desired, be suitably baffled.

The filter section B is mounted on the longitudinal axis of the filter-heater combination and includes a dished head 68, a generally cylindrical shell 69 and a dished bottom 70. Internally, the filter is provided with a foraminous underdrain 71 which divides the interior of the filter into an upper inlet section 72 and a lower clear water outlet section 73. Section 72 contains a suitable filter medium 74, preferably silicious in nature.

As indicated by the arrows, water from the pool, coming through conduit 75, enters the filter B above the water-filter medium interface 76. Filter tail pipe 77 connects lower section 73 with the water side of the interior space defined by tube sheets 66 and 67 and fire-tubes 65. Heated water leaves this interior section and is returned to the pool through discharge pipe 78. As indicated, the shell A and the filter B are suitably constructed with flanged heads so that access may be had to their respective interiors for the purpose of re-tubing the heater section and replacing the filter medium in the filter section B. The abutment of tube sheets 66 and 67 against shell 69 may take the form of a weldment or utilize conventional water-tight expansion joint techniques.

Figure 6:
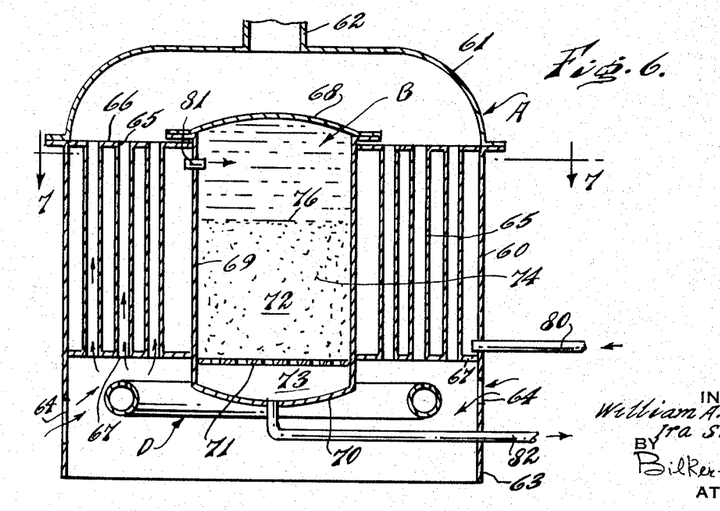
FIGURE 6 represents a fragmentary sectional view of a filter-heater combination of the invention, of the sand type, having an axial filtration section and an annular water heating section, wherein heating is followed by filtration.
Figure 7:
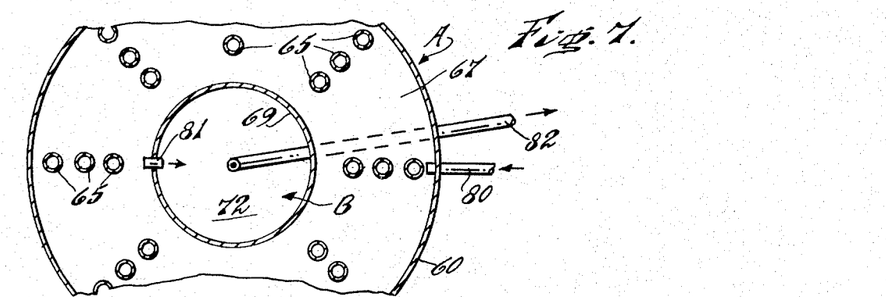
FIGURE 7 represents a fragmentary section taken on line 7—7 of FIGURE 6.

FIGURES 6 and 7, like FIGURES 4 and 5 represent an embodiment of the invention wherein the filter section B also lies along the longitudinal axis of the apparatus and where the water heater C is annularly mounted thereabout. Consequently, the part numbers for FIGURES 4 to 7 inclusive are identical except as to specific points of difference.

In the case of FIGURES 6 and 7 these differences relate to the pattern of flow and liquid treatment. Thus, as shown by the arrows in the embodiment shown of FIGURE 6, water from the pool enters the unit through conduit 80 directly into the bottom of the interior space defined by tube sheets 66 and 67 and fire-tubes 65. Heated water is transferred from the top of this interior section to the top of filter B by shunt conduit 81 which penetrates wall 69. The clarified water from the filter is discharged directly to the pool via outlet conduit 82. With this embodiment, as is apparent, water is heated prior to filtration.

Figure 8:
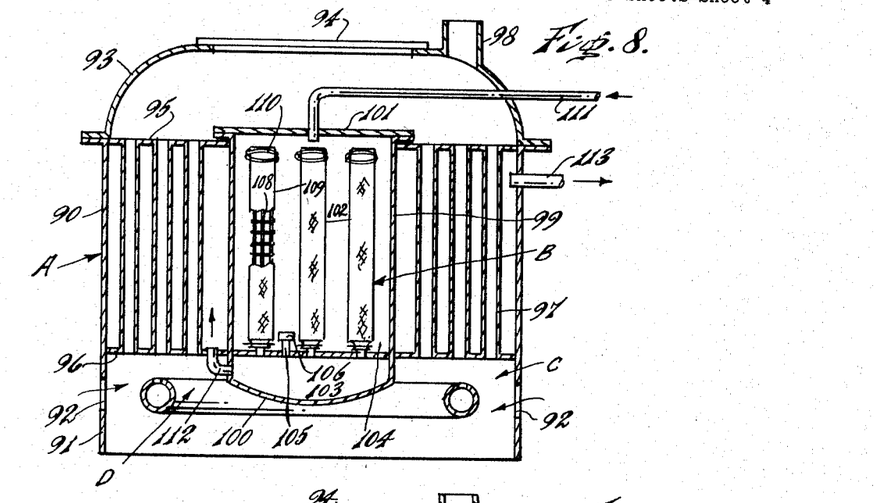
FIGURE 8 represents a sectional view of a filter-heater combination of the invention, of the diatomaceous earth type, having an axial filtration section and an annular water heating section, wherein filtration is followed by heating.
Figure 9:
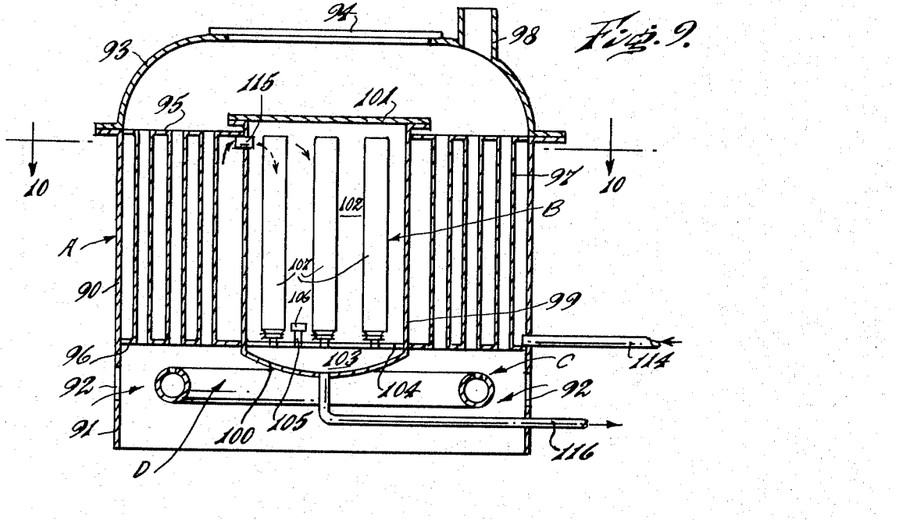
FIGURE 9 represents a sectional view of a filter-heater combination of the invention, of the diatomaceous earth type, having an axial filtration section and an annular heating section, wherein heating is followed by filtration.

In the embodiments of the filter-heater combination of the invention previously discussed the filters were of the sand, sand and gravel or silicious filter medium type. In FIGURES 8 and 9, however, are represented embodiments of the invention which utilize filters of the diatomaceous earth type. In both of these figures the filter section B is a core mounted on the longitudinal axis of the apparatus and the combustion and water heater is annular and concentrically mounted about filter section B. The differences between the embodiments shown in FIGURES 8 and 9 relate only to the sequence of the filter and heating operations. Consequently, the details of construction between these two embodiments are minor and, further, FIGURE 10 may be considered a cross-section which is representative of both embodiments.

Referring now, in detail, to FIGURES 8 and 9 the shell A includes cylindrical sidewalls 90 having integral lower support portions 91 in which are provided a plurality of perimetrically spaced combustion air-inlets 92. The shell is fitted with a dished head 93, preferably flangedly attached to sidewalls 90 so as to permit retubing of the unit. The head 93 is also provided with a removable hatchway or manhole 94 to permit access to filter section B. Within the shell is provided an upper tube sheet 95 and a lower tube sheet 96 between which are mounted a plurality of fire-tubes 97. An off-set chimney 98, mounted on dished head 93, vents combustion gases to the atmosphere. The burner assembly D, and its controls are of the type previously described. As indicated by the arrows, air enters inlets 92 and combustion gases leave the unit by rising upward through tubes 97, into the space above tube sheet 95 and out through chimney 98 which may be suitably baffled.

The filter unit B may be of any suitable diatomaceous earth type but it is preferred to use that type of unit which is described in detail in the co-pending patent application of Ira Silverman, being application No. 234,162 filed Oct. 30, 1962, entitled, "Liquid Clarification Apparatus," and now Patent No. 3,149,072, issued Sept. 15, 1964.

The reason for preferring this type of construction is that a given size (i.e. diameter and height) filter section B can be provided with a relatively wide range of square feet of filtration surface. This flexibility is available because it is possible, within a given shell size, to vary both the number of filter elements and the length of given filter elements. Means for achieving these desiderata are shown in the figures, particularly in FIGURE 8. As shown therein, the filter section B comprises a cylindrical wall 99, a dished bottom 100, and a removable top 101. The interior of the filter is divided into an inlet section 102 and an outlet section 103 by a transverse header plate 104. This header plate, in accordance with the preferred construction, is provided with a plurality of nipples 105 (see FIGURE 8) some of which are removably capped as with cap 106. Upon all the other nipples are removably mounted filter elements 107. Each of these elements is a stacked, latticed structure made up of any desired number of interlocked modules such as modules 108. Since the number of modules can be varied, even in the field, the height of any or all of filter elements 107 may be adjusted to suit particular operating conditions. The module illustrated in FIGURE 8 comprises a thin horizontal annulus from which depends at least three tubular legs. The surface of the annulus remote from the dependent legs is provided with cored detents which prevent circumferential, radial and logitudinal displacement of one module with respect to the other. Atop the latticed module construct, which performs no filtering in itself, is provided a tubular filter bag 109 which also does no filtering but upon which a coating of diatomaceous earth is built up, as is customary in the art. It is the coating of diatomaceous earth, deposited on the surface of filter bags 109, in turn supported by modules 108, which performs the actual filtration. Additionally, helical spacers 110 may be mounted on elements 107 at the end remote from plate 104 to keep the elements 107 in continued parallel relationship despite the build up of filter cake thereupon. While FIGURE 8 shows details of the preferred construction, any suitable diatomaceous earth filter may be used in its place.

Turning now to the hydraulics of operation of the device in FIGURE 8, it will be noted that water from the swimming pool enters filter B through inlet line 111. The water passes through a coating of diatomaceous earth on the surface of bags 109 to the interior of elements 107 passing downwardly through nipples 105 into outlet section 103. Fitting 112 carries this water into the water-side interior of the space between tube sheets 95 and 96 and the exteriors of fire-tubes 97. Heated water rises through this section and is returned to the pool through outlet line 113. Thus, the embodiment shown in FIGURE 8 first filters the water in filter B and, thereafter, heats it.

Operation of the embodiment shown in FIGURE 9 is substantially similar. Here, however, water is first heated and then filtered. This is achieved by allowing water from the pool to enter the bottom of the water-side space between tube sheets 95 and 96 and the exterior of fire-tubes 97 through an inlet line 114. Heated water rises within this section and passes through cross-over conduit 115 into filter inlet section 102. The heated water passes through the filter elements 107 into outlet section 103 and is conveyed from there back to the pool through outlet conduit 116.

Figures 10, 11, 12:
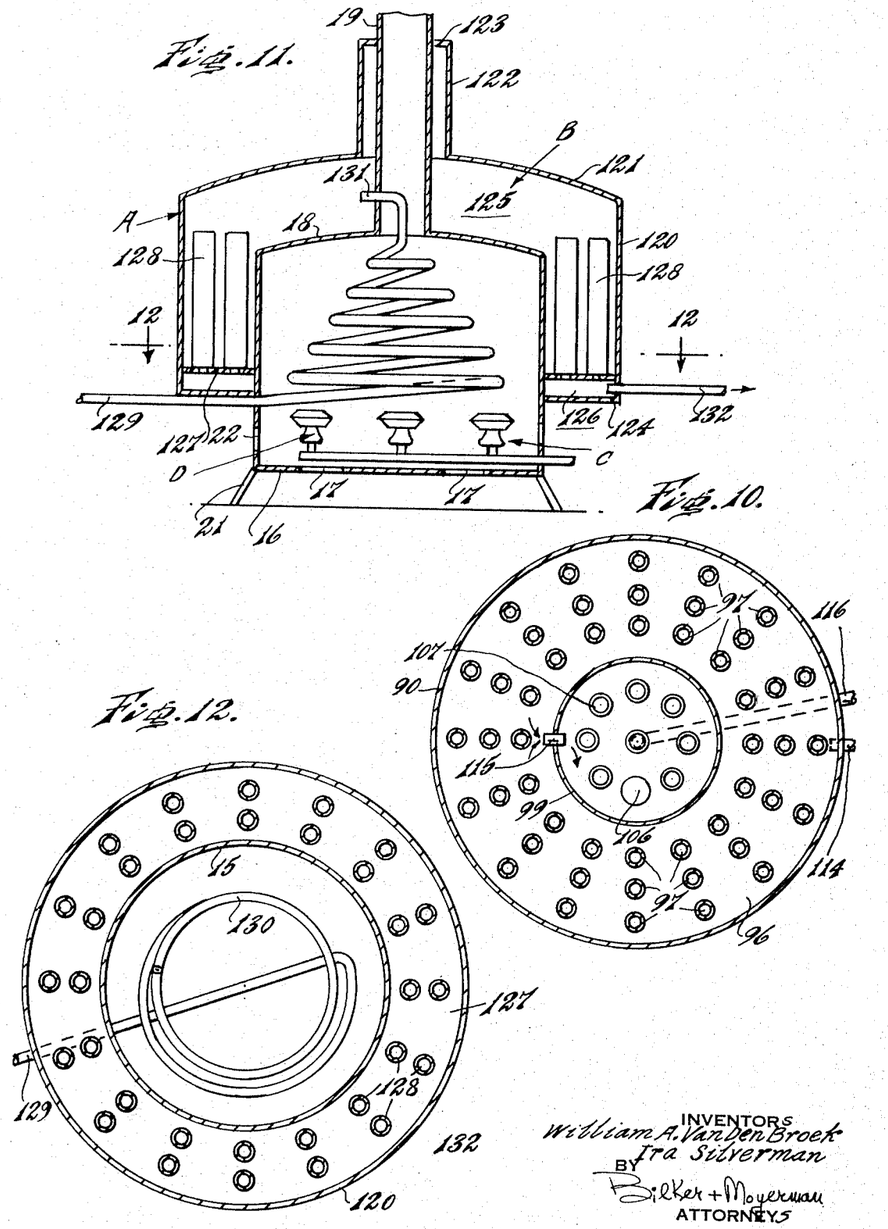
FIGURE 10 represents a section taken on line 10—10 of FIGURE 9 and is also generally representative of a typical section through the types of filter-heaters shown in FIGURE 8.
FIGURE 11 represents a sectional view of a filter-heater combination of the invention, of the diatomaceous earth type, having an annular filtration section and an axial water heating section, wherein filtration is followed by filtration.
FIGURE 12 represents a section taken on line 12—12 of FIGURE 11.
Figure 13:
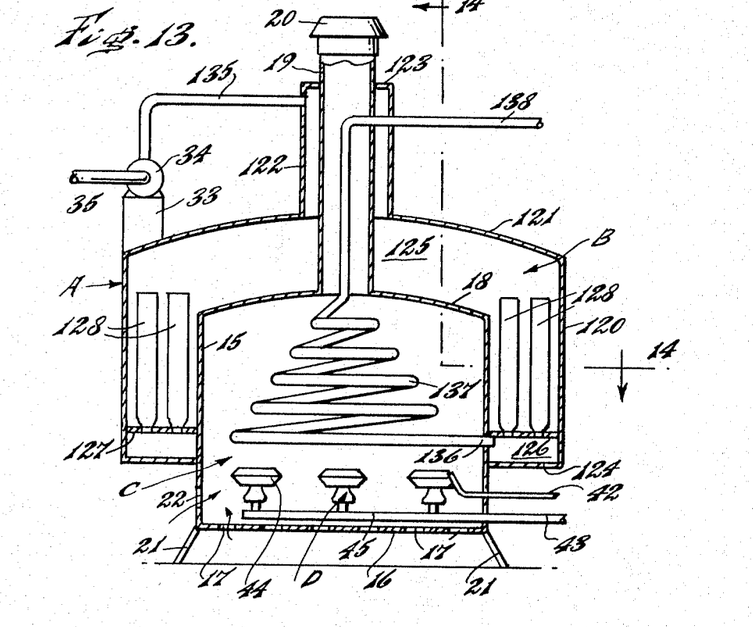
FIGURE 13 represents a sectional view of a filter-heater combination of the invention, of the diatomaceous earth type, having an annular filtration section and an axial water heating section, wheerin filtration is followed by heating.

FIGURES 11 to 14 inclusive show other embodiments of the filter-heater combination of the invention wherein the filter is also of the diatomaceous earth type. In these embodiments, however, the water heating chamber C is located on the longitudinal axis of the apparatus whereas the filter section B is annular and mounted concentrically thereabout. FIGURE 11 represents an embodiment wherein heating is performed prior to filtration and FIGURE 13 represents an embodiment wherein heating is performed after filtration.

Turning now to FIGURES 11 to 14 inclusive it will be observed that the shells A comprise cylindrical sidewalls 120, dished heads 121, risers 122, capped as at 123 and bottoms 124. This construction is substantially identical to that shown in FIGURE 1. Filter section B is divided into an inlet section 125 and an outlet section 126 by an annular transverse header plate 127 which is similar in function and details of construction to header plate 104 in FIGURE 8. Mounted on header plate 127 and perimetrically spaced thereabout are a plurality of filter elements 128 which may be identical in construction to filter elements 107. Flow from inlet section 125 to outlet section 126 is through filter elements 128 to their interior and thence, through header 127 into the outlet section.

The combustion chamber or water heater C and burner assembly D in these embodiments are identical to these components as described in FIGURE 1, and, accordingly, the same part numbers have been used and the same explanation applies.

In FIGURES 11 and 12 water from the pool enters the apparatus through inlet line 129 flowing thence, through sidewall 15 into upwardly extending helical coil 130. Coil 130 terminates in end portion 131 which penetrates chimney 19 into filter inlet section 125 and delivers heated water thereto. The effluent of filter outlet section 126 is returned to the pool through discharge line 132.

Figure 14:
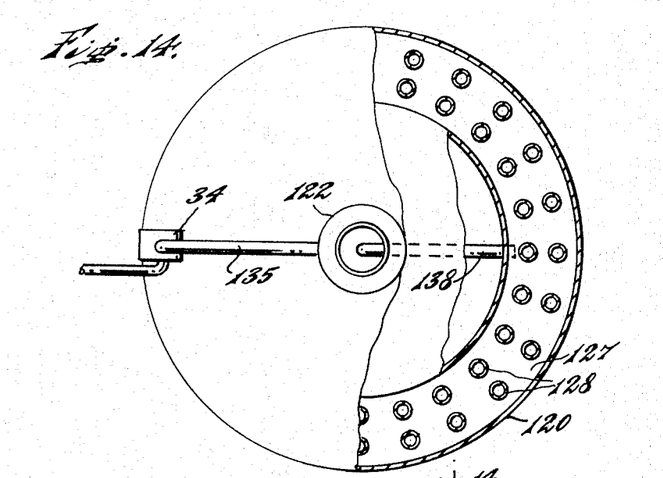
FIGURE 14 represents a fragmentary section taken on line 14—14 of FIGURE 13.

In the embodiment shown in FIGURES 13 and 14, where filtration is performed first, the discharge of pump 34 is conducted to the interior of riser 122 by transfer conduit 135. Flow is down through the riser, into inlet section 125 and through filter elements 128 into outlet section 126. A transition piece 136 connects outlet section 126 with helical coil 137. The coil terminates, as with a horizontal discharge conduit 138 in a piece which penetrates from the interior of chimney 19 to the exterior of the device and thus returns filtered and heated water to the pool. The coils shown in FIGURES 11 and 14 inclusive may be provided with hydraulic by-pass arrangements as illustrated in FIGURE 3 and like the other coils are removable for ease of replacement.

While the apparatus has been described with respect to a gaseous fuel (such as natural gas, manufactured gas, mixtures thereof, bottled gas and the like) it lends itself to the use of oil-fired equipment. While this necessitates some modifications with respect to the water heater C (e.g. provision of a refractory lining) and the control system (e.g. ignition control from a stack relay, activation of burner by an aquastat, etc.) the fundamentals of the apparatus are unchanged.

Although our invention has been described in considerable detail, such description is intended to be illustrative rather than limiting since the invention may be variously embodied and, therefore, the scope of the invention is to be determined only by the appended claims.

Having described our invention, we claim:

1. A swimming pool filter-heater combination comprising a diatomaceous earth filter having a plurality of separate filter elements, a direct fired water heater mounted concentrically with respect to said filter and in direct heat exchange relationship therewith, said heater including a combustion chamber and a chimney; conduit means connecting said heater to a pool, conduit means connecting said heater to said filter for conducting water from one to the other; and conduit means connecting said filter to a pool; whereby cold unfiltered water withdrawn from a pool is returned thereto in heated and filtered condition.

2. A swimming pool filter-heater combination comprising a water filter, an annular direct fired water heater mounted concentrically indirect heat exchange relationship about said filter, said heater including a combustion chamber and a chimney; conduit means connecting said heater to a pool, conduit means connecting said heater to said filter for conducting water from one to the other and conduit means connecting said filter to a pool; whereby cold unfiltered water withdrawn from a pool is returned thereto in heated and filtered condition.

3. A swimming pool filter-heater combination comprising a water filter, a direct fired water heater mounted concentrically with respect to said filter and having a wall in common therewith through which heat is transmitted from combustion gas to liquid, said heater further including a combustion chamber and a chimney; conduit means for conducting cold unfiltered water coming from a swimming pool to said heater, conduit means for conducting heated unfiltered water from said heater to said filter and conduit means for conducting heated and filtered water from said filter back to a swimming pool.

4. The swimming pool filter-heater combination of claim 3 wherein there are provided a central water heater including a heating coil and burner means positioned beneath said coil; an annular filter mounted upon and supported by said water heater and concentric therewith including an annular collector; a conduit for conducting water coming from a swimming pool to the inlet of said coil; a conduit for conducting heated water from the outlet of said coil to the top of said filter; a conduit for conducting heater and filtered water from said collector back toward a pool, said filter-heater permitting direct transfer of heat from said water heater into said filter.

5. The apparatus of claim 4 wherein means are provided for permitting less water to flow through said coil than through said filter.

6. The swimming pool filter-heater combination of claim 2 having a central sand filter of generally cylindrical configuration; fuel burner means operatively associated with said annular heater.

7. The filter-heater combination of claim 6 wherein said heater includes a pair of transverse annular tube sheets longitudinally spaced apart and a plurality of longitudinally extending tubes extending therebetween, water passing on one side of said tubes and combustion gases passing on the other side thereof.

8. A swimming pool filter-heater combination comprising a central diatomaceous earth filter of generally cylindrical configuration having a plurality of separate filter elements; an outer annular direct fired water heater mounted concentrically about said filter including a combustion chamber and a chimney; fuel burner means mounted in said combustion chamber and operatively associated with said heater; conduit means connecting said heater with a swimming pool; conduit means connecting said filter with said swimming pool and conduit means connecting said filter and said heater whereby cold unfiltered water withdrawn from the pool is returned thereto heated and filtered.

9. The filter-heater combination of claim 8 which further includes, within the filter section, a transverse header plate including a plurality of nipples, filter elements removably mounted on some of said nipples and flow-blocking caps mounted on the remaining nipples, each filter element being of stacked latticed modular construction, said construction providing two separate means for variation of the number of square feet of filter surface in a given filter.

10. The filter-heater combination of claim 9 wherein said heater includes a pair of transverse annular tube sheets longitudinally spaced apart and a plurality of longitudinally extending tubes therebetween, water passing on one side of said tubes and combustion gases passing on the other side thereof.

11. The filter-heater combination of claim 8 wherein said heater includes a pair of transverse annular tube sheets longitudinally spaced apart and a plurality of longitudinally extending tubes therebetween, water passing on one side of said tubes and combustion gases passing on the other side thereof.

12. The swimming pool filter-heater combination of claim 1 wherein the water heater is centrally located and has a heating coil and burner means operatively associated therewith; said filter is an annular diatomaceous earth filter having a plurality of separate filter elements mounted concentrically about said heater.

13. The swimming pool filter-heater of claim 12 wherein means are provided for permitting less water to flow through said coil than through said filter.

14. The swimming pool filter-heater combination of claim 12 which further includes, within said filter section, a transverse annular header plate including a plurality of nipples, said filter elements being removably mounted on some of said nipples and flow-blocking caps mounted on the remainder of said nipples, each filter element being of stacked latticed modular construction, said construction providing two separate means for variations of the number of square feet of filter surface in a given filter.

15. The filter-heater combination of claim 1 wherein said water heater is centrally located and said filter is annular, being mounted about said water heater.

16. The filter-heater combination of claim 15 wherein water from a pool is first heated and thereafter filtered.

17. The filter-heater combination of claim 15 wherein water from a pool is first filtered and thereafter heated.

18. The filter-heater combination of claim 1 wherein said filter is centrally located and said heater is annular, being mounted about said filter.

19. The filter-heater combination of claim 18 wherein water from a pool is first heated and thereafter filtered.

20. The filter-heater combination of claim 18 wherein water from a pool is first filtered and thereafter heated.

21. The filter-heater combination of claim 2 wherein said filter is a diatomaceous earth filter having a plurality of separate filter elements.

22. The filter-heater combination of claim 21 wherein water from a pool is first filtered and thereafter heated.

23. The filter-heater combination of claim 21 wherein water from a pool is first filtered and thereafter heated.

24. The filter-heater combination of claim 2 wherein said filter is a sand filter.

25. The filter-heater combination of claim 24 wherein water from a pool is first heated and thereafter filtered.

26. The filter-heater combination of claim 24 wherein water from a pool is first filtered and thereafter heated.

27. The filter-heater combination of claim 3 wherein said filter is a diatomaceous earth filter having a plurality of separate filter elements.

28. The filter-heater combination of claim 27 wherein said filter is centrally located and said heater is annular, being mounted about said filter.

29. The filter-heater combination of claim 27 wherein said water heater is centrally located and said filter is annular, being mounted about said water heater.

30. The filter-heater combination of claim 3 wherein said filter is a sand filter.

31. The filter-heater combination of claim 30 wherein said filter is centrally located and said heater is annular, being mounted about said filter.

32. The filter-heater combination of claim 30 wherein said heater is centrally located and said filter is annular, being mounted about said heater.

References Cited

UNITED STATES PATENTS

| | | | |
|---|---|---|---|
| 1,144,327 | 6/1915 | Greth | 210—169 X |
| 2,960,232 | 11/1960 | Gillette | 210—169 |
| 3,072,134 | 1/1963 | Williamson. | |

FOREIGN PATENTS

| | | |
|---|---|---|
| 6,171 | 12/1901 | Austria. |
| 7,217 | 1903 | Great Britain. |

REUBEN FRIEDMAN, *Primary Examiner.*

F. MEDLEY, *Assistant Examiner.*